US012609218B2

(12) United States Patent
Carrolo

(10) Patent No.: US 12,609,218 B2
(45) Date of Patent: Apr. 21, 2026

(54) WIRING HARNESS ASSEMBLY CELL

(71) Applicant: Aptiv Technologies AG, Schaffhausen (CH)

(72) Inventor: Nuno José Lopes Carrolo, Lisbon (PT)

(73) Assignee: Aptiv Technologies AG, Schaffhausen (CH)

( * ) Notice: Subject to any disclaimer, the term of this patent is extended or adjusted under 35 U.S.C. 154(b) by 604 days.

(21) Appl. No.: 18/083,714

(22) Filed: Dec. 19, 2022

(65) Prior Publication Data

US 2023/0230729 A1 Jul. 20, 2023

(30) Foreign Application Priority Data

Jan. 14, 2022 (GB) ..................................... 2200468

(51) Int. Cl.
| | |
|---|---|
| *H01B 13/012* | (2006.01) |
| *B25J 5/02* | (2006.01) |
| *B25J 9/00* | (2006.01) |
| *B25J 9/16* | (2006.01) |
| *B25J 15/00* | (2006.01) |

(52) U.S. Cl.
CPC .......... H01B 13/01245 (2013.01); B25J 5/02 (2013.01); B25J 9/0096 (2013.01);
(Continued)

(58) Field of Classification Search
CPC ........ H01B 13/01245; H01B 13/01227; H01B 13/01272; H01B 13/01281; H01B 7/0045;
(Continued)

(56) References Cited

U.S. PATENT DOCUMENTS

| | | | |
|---|---|---|---|
| 4,677,734 A | 7/1987 | Bloch et al. | |
| 4,703,558 A * | 11/1987 | Makinen | ................... H01J 9/24 29/784 |

(Continued)

FOREIGN PATENT DOCUMENTS

| | | |
|---|---|---|
| AT | 410609 B | 6/2003 |
| JP | H0721852 A | 1/1995 |
| JP | 2003100160 A | 4/2003 |

OTHER PUBLICATIONS

Heisler p., et.al., Optimization of wire harness assembly using human-robot-collaboration, Procedia CIRP, vol. 72, 2020, p. 260-265 (Year: 2020).*

(Continued)

*Primary Examiner* — Thomas J Hong
*Assistant Examiner* — Jose K Abraham
(74) *Attorney, Agent, or Firm* — Billion & Armitage

(57) ABSTRACT

A wiring harness assembly cell includes an automation zone housing a robot for performing automated assembly operations on a series of wiring harness assembly boards. A plurality of wiring harness assembly stations is located about the automation zone, each including one or more wiring harness assembly boards holding the wiring harnesses. Manual operator zones are located outside the automation zone that are associated with the wiring harness assembly stations. The wiring harness assembly stations are reconfigurable between a first configuration in which a first wiring harness assembly board faces the manual operator zone such that it is accessible to a manual operator, and a second configuration in which it faces the automation zone such that it is accessible to the robot. The robot is moved within the automation zone between a plurality of assembly locations where it accesses and operates on the respectively the plurality of wiring harness assembly stations.

12 Claims, 3 Drawing Sheets

(52) U.S. Cl.
CPC ........... *B25J 9/1669* (2013.01); *B25J 9/1687* (2013.01); *B25J 15/0019* (2013.01); *H01B 13/01227* (2013.01); *H01B 13/01272* (2013.01); *H01B 13/01281* (2013.01)

(58) Field of Classification Search
CPC ............ H01B 13/012; H01B 13/01209; H01B 13/01218; H01B 13/01236; B25J 5/02; B25J 9/0096; B25J 9/1669; B25J 9/1687; B25J 15/0019; H01R 43/28
See application file for complete search history.

(56) References Cited

U.S. PATENT DOCUMENTS

| | | | | |
|---|---|---|---|---|
| 5,526,562 | A * | 6/1996 | Kita | .................... B60R 16/0207 |
| | | | | 198/486.1 |
| 7,650,982 | B2 * | 1/2010 | Tachibana | .......... G05B 19/4189 |
| | | | | 198/339.1 |
| 9,962,841 | B2 | 5/2018 | Schultz | |
| 2007/0215435 | A1 * | 9/2007 | Tachibana | .......... G05B 19/4189 |
| | | | | 198/339.1 |
| 2018/0040395 | A1 | 2/2018 | Shimizu et al. | |
| 2018/0088550 | A1 * | 3/2018 | Kawase | .......... H01B 13/01236 |
| 2018/0108458 | A1 | 4/2018 | Maki et al. | |
| 2020/0168368 | A1 * | 5/2020 | Kawase | .............. B23D 33/006 |
| 2022/0246325 | A1 * | 8/2022 | Sumida | .............. B60R 16/0215 |
| 2023/0051533 | A1 * | 2/2023 | Saitou | ............. H01B 13/01236 |

OTHER PUBLICATIONS

Palomba et al., Mechatronic Re-Design of a Manual Assembly Workstation into a Collaborative One for Wire Harness Assemblies, Robotics, 2021, 10, 43 (Year: 2021).*

English translation for Application No. 200310016, dated Jan. 4, 2022, 10 pages.
PFAFF industrial; Sewing Technology Welding Technology Automation + Robotics Industry 4.0; Garment 2022; 112 pages.
PFAFF Industrial; Sewing Technology Welding Technology Automation + Robotics Industry 4.0; Industrial 2022; 120 pages.
Search Report for Application No. GB2200468.3, dated Mar. 30, 2022, 4 pages.
ABB Robotics: Articulated robot/linear gantry combination; https://www.packworld.com/home/product/13346497/abb-robotics-articulated-robotlinear-gantry-combination; Accessed Nov. 28, 2022., 11 pages.
Selecting a Linear Axis Actuator; https://vention.io/resources/guides/linear-axis-selection-guide-8; Accessed Nov. 28, 2022., 21 pages.
Assembly and Disassembly with Motoman Robots; https://www.yaskawa.eu.com/application/type/application/assembly_a10882; Accessed Nov. 28, 2022., 25 pages.
KUKA Linear Units EN; https://www.kuka.com/-/media/kuka-downloads/imported/9cb8e311bfd744b4b0eab25ca883f6d3/kuka_pb_positioners_linear_units_en.pdf?rev=5b41e95fde78472a8c152eb8f4b1c4e6; Accessed Nov. 29, 2022., 3 pages.
7th Axis Range Extenders for Universal Robots; https://vention.io/blogs/7th-axis-range-extenders-for-universal-robots-131; Accessed Nov. 28, 2022., 4 pages.
Robot linear units; https://www.kuka.com/en-de/products/robot-systems/robot-periphery/linear-units; Accessed Nov. 28, 2022., 4 pages.
Dual Gripper; https://wiredworkers.io/nl/product/onrobot-dual-gripper/; Accessed Nov. 28, 2022., 5 pages.
Expand your work envelope with a customized range extender; https://vention.io/range-extender; Accessed Nov. 28, 2022., 7 pages.
KL 4000 linear axis for loads up to 4,000 kg; https://www.kuka.com/en-de/products/robot-systems/robot-periphery/linear-units/kl-4000; Accessed Nov. 28, 2022., 8 pages.
Communication pursuant to Article 94(3) EPC for EP Application No. 22 215 158.1; mailed on Jun. 12, 2025, 11 Pages.

* cited by examiner

WIRING HARNESS ASSEMBLY CELL

CROSS-REFERENCE TO RELATED APPLICATION

This application claims benefit of priority to Great Britain Patent Application No. 2200468.3 filed on Jan. 14, 2022, the entire disclosure of which is hereby incorporated by reference.

TECHNICAL FIELD OF THE INVENTION

The present disclosure relates to a wiring harness assembly cell, and in particular a semi-automated wiring harness assembly cell having a robot movable between multiple wiring harness assembly stations.

BACKGROUND

Vehicle wiring harnesses are used in automotive applications to transmit electrical power supply or data signals around a vehicle. Wiring harnesses includes a bundle of electrical cables that are pre-assembled to arrange the cables in the correct routing lengths and configurations for use in the vehicle. The cables are bound together for example using tape, clips, cable ties, or conduits. The terminal ends of the cables are provided with connector elements for electrical connection to the associated in-vehicle components. The wiring harness is also provided with body clips at various locations along its limbs for mechanically connecting the cable harness to various structures within the vehicle.

In a common assembly process a wiring harness is manufactured on a harness assembly board. The harness assembly board typically includes a schematic of the wiring routes with labelling indicating the components required at each associated location along the harness. A series of routing forks mounted on the harness assembly board support the wiring bundles. The harness assembly board also includes body clip holders to hold and retain the body clips during assembly.

During assembly, an assembly operator manually inserts body clips in each body clip holder and then mounts the wiring harness onto the routing forks. The wiring bundles are manually routed along the wiring pathways and inserted into the routing forks. A series of cables ties are applied along the cables to hold the wires together and secure the bundles to the body clips. Adhesive tape is then applied along the wires to create a sleeve that binds the individual wires together and groups them in bundles for improved connectivity. Cable ties are also used to secure the wire bundles to the body clips. When the assembly process is complete the wiring harness is removed from the assembly board and the process is restarted with a further wiring harness.

High voltage cables require significantly more taping than lower voltage cables due their size, the requirement to protect the cables and to mitigate the risk of arcing. These high voltage cables also require many more body clips than low voltage cables to support their weight and ensure securement. The process of applying tape and body clips to high voltage cables is therefore very labour intensive and time consuming. Attempts have been made to automate these aspects of the assembly process. Robots have been developed to perform taping operations, which significantly reduces the time of this step in the process. It is also possible to automate the application of cable ties to secure the body clips to the wiring harness. A robot is positioned at a fixed static location adjacent the harness assembly board and is operated at required stages during the assembly process. However, a human operator must still perform the remaining operations.

For safety reasons it is not possible for human operators and robots to operate simultaneously on an assembly board. The human operator must pause any operations and withdraw from the assembly board while the robot is operated. The robot must then be similarly retracted and paused while the human operator completes the manual operations. Consequently, the efficiency and utilisation of both the human operator and the robot is compromised. The requirement for a dedicated robot for each assembly board also makes automation of larger scale assembly processes involving more than one assembly board prohibitively expensive.

It is therefore desirable to provide an improved wiring harness assembly cell which addresses the above-described problems and/or which offers improvements generally.

SUMMARY

According to the present disclosure there is provided a wiring harness assembly cell as described in the accompanying claims.

In an aspect of the disclosure there is provided a wiring harness assembly cell including an automation zone; a robot located within the automation zone that is operative to perform one or more automated assembly operations; a plurality of wiring harness assembly stations located at the periphery of the automation zone, each including one or more wiring harness assembly boards configured to hold one or more wiring harnesses; and a plurality of manual operator zones located outside the automation zone respectively associated with the plurality of wiring harness assembly stations. Each wiring harness assembly station is reconfigurable between a first configuration in which a first wiring harness assembly board faces the respective manual operator zone such that it is accessible to a manual operator located in the manual operator zone, and a second configuration in which the first wiring harness assembly board faces the automation zone such that it is accessible to the robot, and wherein the robot is movable within the automation zone between a plurality of assembly locations corresponding respectively to the plurality of wiring harness assembly stations in which the robot is able to access respectively said corresponding plurality of wiring harness assembly stations.

The automation zone is the area in which the robot is located and is not occupied by manual operators for safety reasons. Manual operators are located outside the automation zone in the manual operator zone. Providing the assembly cell with a plurality of reconfigurable assembly stations enables a manual operator to perform a manual operation on a first assembly board while robot operates on a second assembly board of another assembly board station simultaneously. The operator may then reconfigure the assembly station to face the first assembly board into the automation zone to be operated on by the robot while the manual operator attends to a further assembly board. In this way utilisation of both the manual operator and the robot is improved and down time is reduced. The ability to use a single robot that moves within the cell to operate on multiple assembly board stations is a very cost-effective solution that avoids the requirement for multiple robots to achieve the same result.

Each assembly board station preferably includes a first assembly board having a first mounting surface on which a wiring harness is mountable and a second assembly board having a second mounting surface on which a wiring harness is mountable, the first and second assembly boards being rotatable between the first configuration in which the first support surface of the first wiring harness assembly board faces the respective manual operator zone such that it is accessible to a manual operator located in the manual operator zone while the second mounting surface of the second wiring harness assembly board faces into the automation zone such that it is accessible to the robot, and a second configuration in which the second support surface of the second wiring harness assembly board faces the respective manual operator zone such that it is accessible to a manual operator located in the manual operator zone while the first mounting surface of the first wiring harness assembly board faces into the automation zone such that it is accessible to the robot. The first and second assembly boards are preferably arranged back-to-back and are rotated in the horizontal plane about a vertical rotational axis. The location of two assembly boards at each assembly board station allows a single operator to be located at each assembly board station and for that operator to work continuously by rotating the assembly boards when the manual operations on a first assembly board have been completed, and to perform the manual operations on the second assembly board while the first assembly board is operated on by the robot. The manual operator remains within the dedicated manual operator station, which is a subzone of the manual operator zone associated with a specific assembly board station. Each manual operator station may be staffed, and the robot is sequenced to minimise any downtime.

Each assembly board station may include a rotatable support panel and the first and second wiring harness assembly boards are mounted to the rotatable support panel. The support panel is rotatably mounted within an outer frame that forms part of a side wall of the automation zone.

The automation zone is preferably surrounded on one or more sides by a partition wall, and each assembly board station is located in a corresponding aperture in the wall. In the first and second configurations the support panel is arranged to substantially close the aperture and form a continuation of the partition wall, thereby ensuring safety of the manual operator.

The robot is preferably mounted on a guide rail and is movable along the guide rail between the plurality of assembly locations. The guide rail is preferably a linear rail, and the robot is slidingly supported on the guide rail, for example on roller bearings. The cell may include drive means for moving the robot along the guide rail. The cell includes a controller running software operable to control the robot. The drive means is preferably operated by a controller which is programmed with the linear location along the guide rail of each assembly board station and the lateral position of each assembly board station relative to the guide rail.

The automation zone preferably includes first and second sides and one or more assembly board stations are located along the first side and a further one or more assembly board stations are located along the second side and the guide rail is arranged such that the robot is able to access the assembly board stations of the first and second sides. Preferably a plurality of assembly board stations is located in series along each side wall. Assembly board stations may also be located at one of more end walls.

The automation zone is preferably substantially rectangular having a width and a length. The guide rail extends lengthwise along the automation zone and the first and second side walls are arranged width wise either side of the guide rail and parallel therewith.

The robot preferably includes a taping head configured to apply tape about wiring bundles of a wiring harness.

The robot preferably includes a body clip applicator configured to apply body clips to a wiring harness.

The body clip applicator is preferably configured to apply single piece body clips including a body clip head, body clip body and integrated cable tie, the body clip applicator being operative to wrap the cable tie about a wiring bundle and lock the cable tie thereto to secure the body clip to the wiring harness.

A controller preferably operates the robot. Each wiring harness assembly board includes an identifier indicating the wiring schematic mounted on the wiring harness assembly board, and the cell further includes one or more readers for reading the identifier and transmitting the identifier data to the controller, and the controller is operative to control the robot based on the identifier data.

Each wiring harness assembly board preferably includes a wiring schematic located on the mounting surface illustrating the route of the one or more wiring harnesses to be mounted to the wiring harness assembly board and the identifier includes graphical information provided on the wiring schematic. The identifier is preferably a QR code or barcode, and the reader is a scanner for such codes.

The reader is preferably mounted to the robot such that the reader is able to read the identifier of the wiring harness assembly board when the robot is moved to the respective assembly location. As such only a single reader is required, rather than readers being provided at each assembly board station.

In another aspect of the disclosure there is provided a method of assembling a wiring harness including the step of:

providing a wiring harness assembly cell including:

an automation zone;

a robot located within the automation zone;

a plurality of wiring harness assembly stations, each including one or more wiring harness assembly boards configured to hold one or more wiring harnesses; and a plurality of manual operator zones located outside the automation zone respectively associated with the plurality of wiring harness assembly stations.

The method further includes the steps of:

mounting a wiring harness on a first wiring harness assembly board within the manual operator zone when the wiring harness assembly station is in a first configuration in which the first wiring harness assembly board faces the respective manual operator zone;

performing one of more manual operations on the wiring harness;

reconfiguring the wiring harness assembly station to a second configuration in which the first wiring harness assembly board faces into the automation zone; and moving the robot to an assembly location corresponding to the wiring harness assembly station and operating the robot to perform an automated assembly operation on the wiring harness mounted on the first wiring harness assembly board.

BRIEF DESCRIPTION OF THE DRAWINGS

The present invention is now described, by way of example with reference to the accompanying drawings, in which.

DETAILED DESCRIPTION

Figure 1:
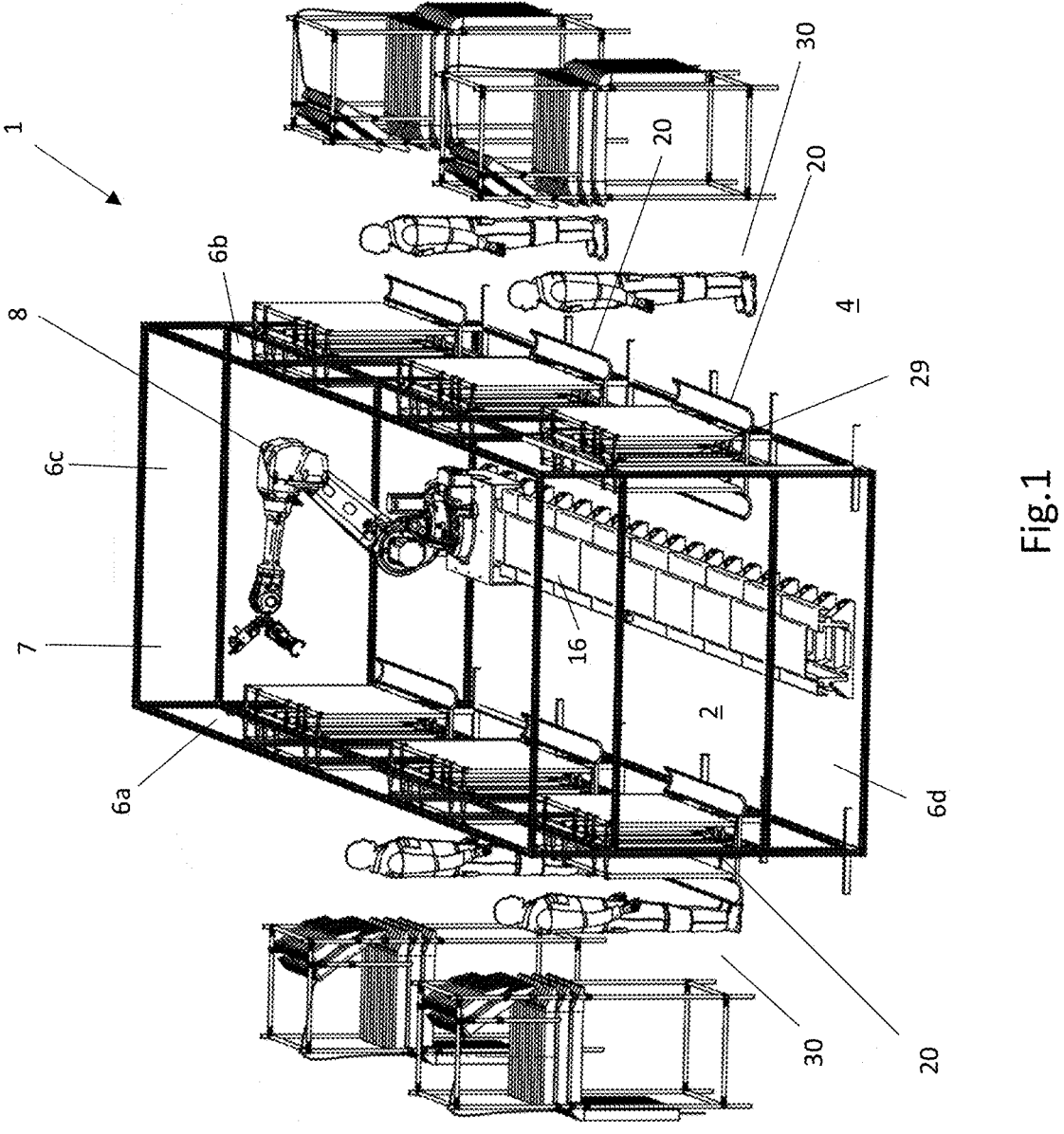
FIG. 1 shows a wiring harness assembly cell according to an embodiment.

Referring to FIG. 1 an assembly cell 1 for the assembly of a high voltage wiring harness includes an automation zone 2 and a plurality of manual operator zones 4. A plurality of walls 6a-d surround and enclose the automation zone 2 and partition the automation zone 2 from the manual operator zone 4 for safety purposes. The partition walls 6a-d are formed of a frame structure 5 supporting a plurality of transparent panels 7. A robot 8 is located within the automation zone 2. The robot 8 is configured for performing one or more automated assembly tasks for the assembly of a wiring harness.

Figure 2:
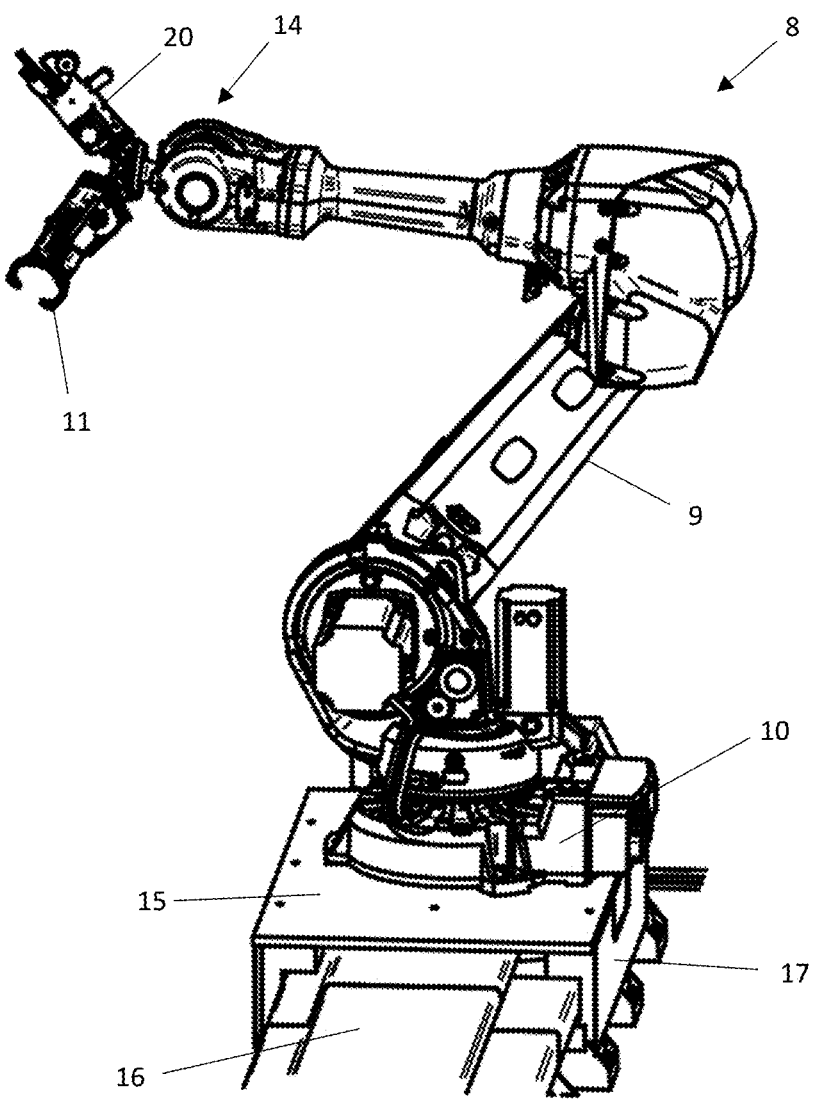
FIG. 2 shows the robot of the wiring harness assembly cell of FIG. 1 according to an embodiment.

As shown in FIG. 2, the robot is a 6-axis robot having an articulated arm 9 mounted to a base 10 at its proximal end. The robot 8 includes a taping head 12 for the automated application of tape to the wiring harness. The robot 8 also includes a body clip applicator head 11 configured to secure single piece body clips to the wiring bundles. A work head 14 is mounted to the distal end of the articulated arm 8. The work head 14 includes the taping head 12 and the body clip applicator head 11. The work head 14 may further or alternatively include one or more other automated tool heads for performing automated assembly functions. The taping head 12 and body clip head 11 are pivotally mounted at the distal end of the arm. The work head 14 is configured to selectively rotate the required working head at an advanced operational position and pivotally retract the other working head to enable the selected working head to operate unhindered.

The base 10 of the robot 8 is mounted to a linear guide rail 16. The guide rail 16 extends lengthwise along the centre of the automation zone 2 and is located equidistant from and parallel with the side walls 6a and 6b, which are located on opposing sides of the guide rail 16. The robot 8 is slidingly mounted on the guide rail 16, which enables the robot 8 to be moved linearly along the guide rail 16 to a series of longitudinal positions. The base 10 includes a horizontal base panel 15 and side walls 17 that hook beneath the guide rail to locate and laterally guide the base 10 on the guide rail 16. The base 10 is supported on the guide rail 16 on roller bearings which enable it to slidingly translate along the guide rail 16. An actuator is provided for moving the robot along the guide rail. The actuator may be an electric motor mounted in the base 10 of the robot having a drive mechanism and rollers or other drive members that engage the guide rail 16. However, it will be appreciated that any suitable drive means could be used to move the robot 8. The actuator is operated by a controller that controls the actuator to move the robot to predefined longitudinal positions along the guide rail 16. The arm 10 of the robot 8 is also rotationally mounted on the base 10 and is rotatable through 360 degrees in the horizontal plane. The robot 8 is therefore able to be rotated to operate on assembly boards on both sides 6a, 6b of the cell 1 as well as being movable linearly along the cell 1. It will be appreciated that the disclosure is not limited to a single axis linear sliding robot and in other embodiments the robot may be movable along two or more Referring again to FIG. 1, the side walls 6a and 6b of the automation zone are located at, and define the boundary between, the automation zone 2 and the manual operator zone 4. Each side wall 6a, 6b includes a series of partition panels 7, or may alternatively include a single wall panel structure or any other suitable partition structure. The partition panels 7 are transparent to enable the operators to observe the operation of the robot 8 within the automation zone 2. A series of wiring harness assembly board stations 20 are located along each side wall 6a, 6b.

Figure 3:
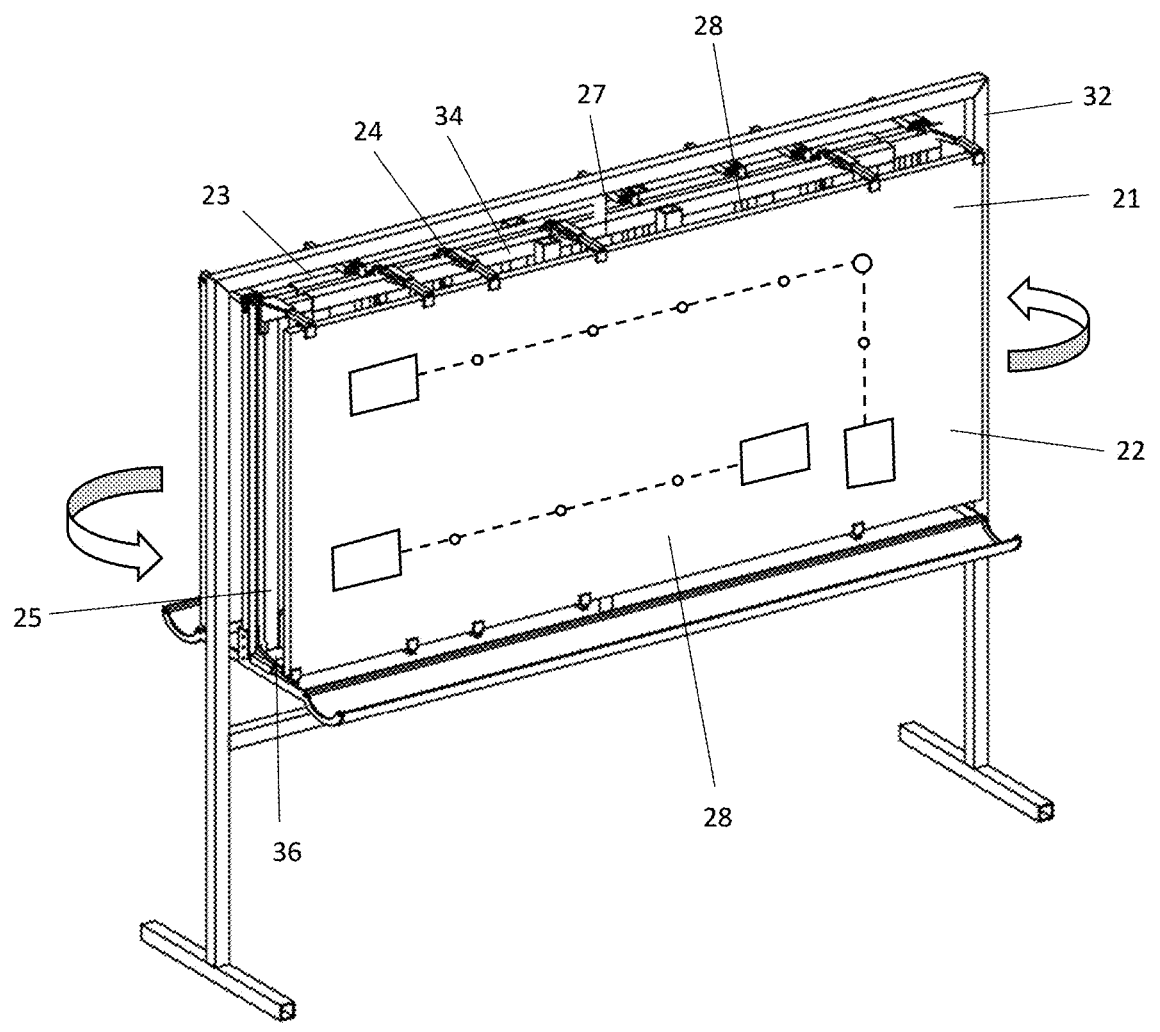
FIG. 3 shows a wiring harness assembly board station of the wiring harness assembly cell of FIG. 1 according to an embodiment.

As shown in FIG. 3, the wiring harness assembly board stations 20 each include a first assembly board 22 and second assembly board 24. The first assembly board 22 has a first mounting surface 21 and the second assembly board 24 has a second mounting surface 23. The first assembly board 22 and second assembly board 24 are mounted back-to-back such that the first mounting surface 21 and second mounting surface 23 face away from each other in opposite directions. Each assembly board station 20 is located within a corresponding aperture 29 formed in the side walls 6a, 6b.

The first and second mounting surface 21,23 each include a printed schematic located on the upper surface thereon illustrating the routing of the wires and the location and type of the body clips. The wiring schematics are provided as printed sheets or boards. Alternatively, they could be projected onto the surface of the wiring assembly boards or displayed by any other suitable means. Each assembly board 22, 24 includes fasteners for securing the printed schematic to the mounting surface 26,28 of the assembly board 22, 24. The fasteners are positioned to ensure that the schematic is in located in correct registration on the surface of the assembly board.

Each wiring harness assembly board 22, 24 also includes a series of holders for securing the electrical connectors of the wiring harness in position on the wiring harness assembly board 22, 24. The holders are also reconfigurable to allow the configuration of the wiring harness assembly to be modified based on the schematic. The holders include an open fronted enclosure that a connector is inserted into in a direction octagonal to the length of the cable. Locking elements are then closed to lock the connector within the holder. Securing the electrical connectors in the holders in this way ensures that the cables do not release when operated on by the robot 8. The holders secure the connectors at a fixed location and the cables can be stretched between the holders to apply tension to the cables to hold them in substantially straight and non-sagging manner along their length that is optimised for the tape applicator 12 of the robot 8.

Each assembly board station 20 includes a support frame 25 and a transparent panel 28 mounted within the support frame 25. The first and second assembly boards 22, 24 are mounted to the support frame on opposing sides of the panel 28. In the embodiment of FIG. 3 the support frame 25 is rectangular and arranged in a landscape orientation corresponding to the shape and orientation of the assembly boards 22, 24, although alternative arrangements may be used in other embodiments. The support frame 25 is vertically oriented and the panel 28 forms a continuation of the respective side wall 6a, 6b. The assembly boards 22, 24 are mounted to opposing sides of the frame 25 and are angled away from the vertical axis such that they slope outwardly away from the frame 25 in the downwards direction with the lower edge of the board 22, 24 being spaced further from the frame 25 than its upper edge.

The assembly board station 20 is reconfigurable between a first configuration in which the first assembly board 22 faces outwardly to the manual operator zone 4 and the second assembly board 24 faces inwardly to the automation zone 2, and a second configuration in which the first assembly board 22 faces inwardly to the automation zone 2 and the second assembly board 24 faces outwardly to the manual operator zone 4. A series of manual operator stations 30 are defined around the cell 1 within the manual operator zone 4 adjacent each assembly board station 20. A vertical rotational axis is defined width wise at the centre of each support frame 26. The support frame 25 is rotationally mounted within a surrounding outer frame 32. The support frame 25 includes an upper frame member 34 and lower frame member 36. The upper and lower frame members 34,36 are mounted to outer frame 32 by rotational mounts 27. The rotational mounts 27 are arranged to enable the support frame 25 to rotate 360 degrees in the horizontal plane about the vertical rotational axis to move the assembly board station 20 between the first and second configurations. This ensures that the assembly boards 22, 24 are in the same tilted orientation in both the first and second configurations.

In the first configuration the first assembly board 22 faces outwardly to the operator zone 4 and an operator standing in the manual operation station 30 associated with that assembly board station 20 can manually engage with and work on the first assembly board 22. The operator mounts a wiring harness, or several wiring harnesses, onto the first assembly board 22. The operator firstly mounts the wiring harness onto the routing forks or other suitable supports, ensuring that the wiring bundles follow the route defined by the schematic. The free ends of the wiring harness are provided with electrical connectors and the manual operator locates the electrical connectors into the corresponding connector holders of the assembly board 22 to locate and secure the free ends of the wiring harness. The connector holders are configured to open to receive the electrical connectors and close to clamp the electrical connectors in position. The connector holders may include locking means such as a latch to lock them in the closed configuration.

When the first manual operation stage is complete and the wiring harness or harnesses are mounted to the board, the assembly board station 20 is then rotated into the second configuration such that the first assembly board 22 faces into the automation zone 2. The orientation of the first assembly board 22 in the second configuration is such that the robot 8 can readily access and operate on the wiring harness supported on the first mounting surface 26 of the first assembly board 22. The panel 28 functions as a barrier, ensuring the safety of the manual operators outside the automation zone 2. To access the first assembly board 22 the robot 8 is moved along the guide rail to an automated operation location corresponding to the longitudinal location of the respective first assembly board 22 along the length of the cell 1. In the automated operation location, the robot 8 is located immediately adjacent the wiring harness assembly board 22. The wiring harness schematic includes visual information identifying the wiring schematic mounted on the first assembly board 22. The visual identifier may be a barcode, QR code or any other suitable visual indicator, alternatively the schematic may include other means of identification such as an RFID tag. The robot 8 includes means for identifying the indicator information. Where the indicator information is a barcode or QR code the robot 8 may include a scanner capable of reading the barcode or QR code. The information from the scanner is relayed to the controller which identifies the corresponding wiring schematic and operates the robot 8 accordingly to perform the automated assembly operations corresponding to that schematic.

In a first automated assembly operation the taping head 12 is rotated into position and the robot 8 is operated to automatically apply tape to the wiring bundles to secure the wiring bundles together. Following the taping operation, the work head 14 of the robot 8 is reconfigured to retract the taping head 12 and advance the body clip applicator head 11. The robot 8 is then operated to apply single piece body clips to the wiring harness. The single piece body clips include a body clip having a head and a body section for insertion into the vehicle body. The body clip also includes an integrally moulded cable tie extending away from the head in the opposite direction to the body section. A locking aperture for the cable tie is integrally formed as part of the head and is arranged to receive the distal end of the looped cable tie to secure and lock the cable tie. The body clip applicator head 11 is configured to hold the body clip and loop the cable tie around a corresponding location on the wiring harness, and to insert the distal end through the locking aperture to secure the cable tie and associated body clip to the wiring harness.

The wiring schematic includes markers indicating the required locations of the body clips that are identified by the robot 8 which applies the appropriate body clip at each location. The wiring schematic also includes indicators such as illustrations of the body clips to confirm the body clip type required at each location. The use of a single body clip and automated applicator significantly reduces the time and complexity of applying the body clips and reduces cycle time. The single piece body clips are also capable of being manufactured more cost effectively than a three-piece body clip and cable tie solution.

The location of the wires, the length of the taping runs, the taping pattern such as the selection of continuous taping or intermittent taping, is instructed by the controller based on the wiring schematic. While the automated steps are performed on the first assembly board 22 the second assembly board 24 is outwardly facing into the manual operator zone 4. While the robot 8 is performing automated operations on the wiring harness of the first assembly board 22 a manual operator is able to load a wiring harness onto the second assembly board 24 and perform the required manual operations thereon. When the automated steps have been completed on the first assembly board 22 and the manual operations have been completed on the second assembly board 24, the assembly station 20 may be rotated to the first configuration again.

The assembly board stations 20 are arranged in series along each side wall 6a, 6b of the assembly cell. The robot 8 is operable to perform automated assembly tasks on each of the assembly board stations 20 of the cell 1. Once the robot has completed the automated assembly operations on an assembly board 22, 24 of a first assembly board station 20 it can be immediately moved to an assembly board 22, 24 of a further assembly board station 20 within the cell 1 to immediately commence assembly operations on the wiring harness of that assembly board 22, 24. As a result, there is no delay while the robot 8 waits for the manual operation on the first assembly board station 20 to be completed, or for the manual operator to rotate the first assembly board station 20. Instead, the root 8 is moved onto the next assembly board station 20 and can return to the first assembly board station 20 at a later stage in the process to operate on the second assembly board 24.

The robot 8 may be moved linearly and in series along each assembly board station 20 along a first side 6a of the cell 1 before being returned to the start of the rail 16 and rotated to the second side 6b of the cell 1 and similarly operating on each assembly board station 20 on that side in a linear sequential manner. However, this is not essential, and the robot 8 may be operated to move between the assembly board stations 20 in any sequence and with any desired timing. The robot 8 is also not limited to single axis linear movement and in other embodiments the robot 8 may be moved along additional horizontal axes and/or vertical axes between multiple assembly boards.

Locating the robot 8 within the automation zone 2 of the cell and the manual operators within the manual operator zone 4 outside the sell enables the robot 8 and the manual operators to work simultaneously and continuously on the assembly board stations 20 of the assembly cell 1. While a manual operator is locating the wiring harness on a first assembly board 22 the robot 8 may operate on the second assembly board 24 of that assembly board station 20 or at another assembly board station 20. At the same time other operators may be manually preparing wiring harnesses on the assembly boards 22, 24 of further assembly board stations 20. The manual and automated operations of the manual operators and the robot 8 may be coordinated and synchronised to maximise utilisation and efficiency of both the manual operators and the robot. The ability to move the robot 8 linearly along the guide rail 16 and to rotate the robot 8 to operate on assembly boards 22, 24 on both sides 6a, 6b of the cell 1 allows multiple assembly boards 22, 24 to be operated on by the same robot 8. The requirement for only a single robot in a cell that can operate on multiple assembly boards obviates the requirement for numerous robots, which minimises the cost and complexity of the assembly cell.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A wiring harness assembly cell, comprising:

an automation zone;

a robot located within the automation zone and operative to perform one or more automated assembly operations;

a plurality of wiring harness assembly stations, each comprising one or more wiring harness assembly boards configured to hold one or more wiring harnesses; and a plurality of manual operator zones located outside the automation zone respectively associated with the plurality of wiring harness assembly stations, wherein each wiring harness assembly station is reconfigurable between a first configuration in which a first wiring harness assembly board faces the respective manual operator zone such that it is accessible to a manual operator located in the manual operator zone, and a second configuration in which the first wiring harness assembly board faces the automation zone such that it is accessible to the robot, and wherein the robot is movable within the automation zone between a plurality of assembly locations corresponding respectively to the plurality of wiring harness assembly stations in which the robot is able to access respectively said corresponding plurality of wiring harness assembly stations, wherein each wiring harness assembly station comprises a rotatable support panel and the first and second wiring harness assembly boards are mounted to the rotatable support panel, wherein the automation zone is surrounded on one or more sides by a partition wall, and wherein each wiring harness assembly station is located in a corresponding aperture in the wall and the support panel is arranged to substantially close the aperture in the first and second configurations.

2. The wiring harness assembly cell according to claim 1, wherein each wiring harness assembly station comprises a first assembly board having a first mounting surface on which a wiring harness is mountable and a second assembly board having a second mounting surface on which a wiring harness is mountable, the first and second assembly boards being rotatable between the first configuration in which a first support surface of the first wiring harness assembly board faces the respective manual operator zone such that it is accessible to a manual operator located in the manual operator zone while the second mounting surface of the second wiring harness assembly board faces into the automation zone such that it is accessible to the robot, and a second configuration in which the second support surface of the second wiring harness assembly board faces the respective manual operator zone such that it is accessible to a manual operator located in the manual operator zone while the first mounting surface of the first wiring harness assembly board faces into the automation zone such that it is accessible to the robot.

3. The wiring harness assembly cell according to claim 2, wherein the robot is mounted on a guide rail and is movable along the guide rail between the plurality of assembly locations.

4. The wiring harness assembly cell according to claim 3, further comprising drive means for moving the robot along the guide rail.

5. The wiring harness assembly cell according to claim 4, wherein a controller operates the drive means.

6. The wiring harness assembly cell according to claim 3, wherein the automation zone comprises first and second sides and one or more wiring harness assembly stations are located along the first side and a further one or more wiring harness assembly stations are located along the second side and the guide rail is arranged such that the robot is able to access the wiring harness assembly stations of the first and second sides.

7. The wiring harness assembly cell according to claim 1, wherein the robot comprises a taping head configured to apply tape about wiring bundles of a wiring harness.

8. The wiring harness assembly cell according to claim 1, wherein the robot is operated by a controller, each wiring harness assembly board comprises identifier data indicating a wiring schematic mounted on the wiring harness assembly board, and the cell further comprises one or more readers for reading the identifier data and transmitting the identifier data to the controller, and the controller is operative to control the robot based on the identifier data.

9. The wiring harness assembly board according to claim 8, wherein each wiring harness assembly board comprises a wiring schematic located on a mounting surface illustrating a route of the one or more wiring harnesses to be mounted to the wiring harness assembly board and the identifier data comprises graphical information provided on the wiring schematic.

10. The wiring harness assembly board according to claim 8, wherein the reader is mounted to the robot such that the reader is able to read the identifier data of the wiring harness assembly board when the robot is moved to the respective assembly location.

11. A wiring harness assembly cell, comprising:

an automation zone;

a robot located within the automation zone and operative to perform one or more automated assembly operations;

a plurality of wiring harness assembly stations, each comprising one or more wiring harness assembly boards configured to hold one or more wiring harnesses; and a plurality of manual operator zones located outside the automation zone respectively associated with the plurality of wiring harness assembly stations, wherein each wiring harness assembly station is reconfigurable between a first configuration in which a first wiring harness assembly board faces the respective manual operator zone such that it is accessible to a manual operator located in the manual operator zone, and a second configuration in which the first wiring harness assembly board faces the automation zone such that it is accessible to the robot, and wherein the robot is movable within the automation zone between a plurality of assembly locations corresponding respectively to the plurality of wiring harness assembly stations in which the robot is able to access respectively said corresponding plurality of wiring harness assembly stations, wherein the robot is mounted on a guide rail and is movable along the guide rail between the plurality of assembly locations, wherein the automation zone comprises first and second sides, and wherein the automation zone has a width and a length, the guide rail extends lengthwise along the automation zone and the first and second sides are arranged width wise either side of the guide rail and parallel therewith.

12. A wiring harness assembly cell, comprising:

an automation zone;

a robot located within the automation zone and operative to perform one or more automated assembly operations;

a plurality of wiring harness assembly stations, each comprising one or more wiring harness assembly boards configured to hold one or more wiring harnesses; and a plurality of manual operator zones located outside the automation zone respectively associated with the plurality of wiring harness assembly stations, wherein each wiring harness assembly station is reconfigurable between a first configuration in which a first wiring harness assembly board faces the respective manual operator zone such that it is accessible to a manual operator located in the manual operator zone, and a second configuration in which the first wiring harness assembly board faces the automation zone such that it is accessible to the robot, and wherein the robot is movable within the automation zone between a plurality of assembly locations corresponding respectively to the plurality of wiring harness assembly stations in which the robot is able to access respectively said corresponding plurality of wiring harness assembly stations, wherein the robot comprises a body clip applicator configured to apply body clips to a wiring harness, wherein the body clip applicator is configured to apply single piece body clips comprising a body clip head, body clip body and integrated cable tie, and wherein the body clip applicator is operative to wrap the cable tie about a wiring bundle and lock the cable tie thereto to secure the body clip to the wiring harness.

* * * * *